Nov. 28, 1944. F. W. LAUCK 2,363,980
HEAD FOR GLASS LINED TANKS
Filed April 21, 1943
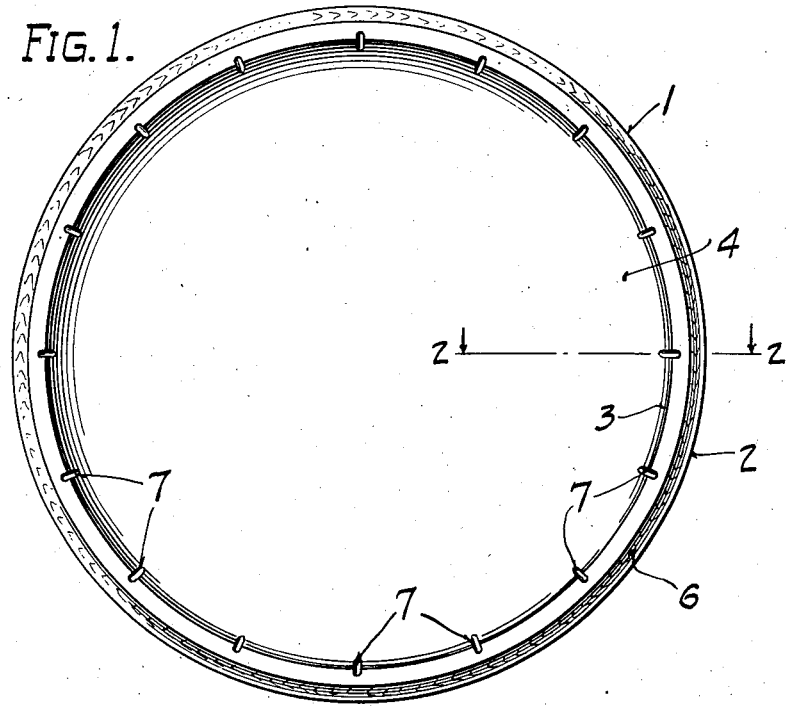
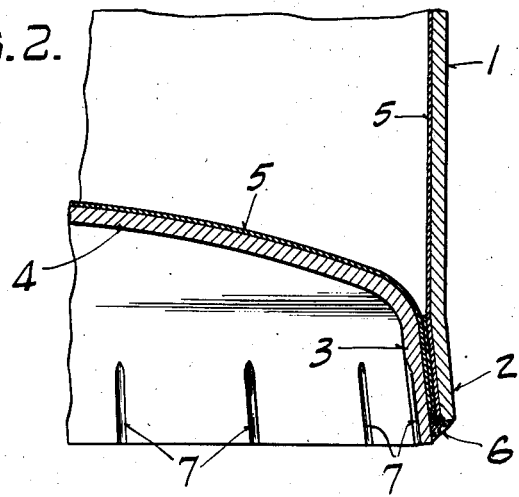
Francis W. Lauck
INVENTOR.
BY Elwin A. Andrus
ATTORNEY.

Patented Nov. 28, 1944

2,363,980

UNITED STATES PATENT OFFICE 2,363,980

HEAD FOR GLASS-LINED TANKS

Francis W. Lauck, Milwaukee, Wis., assignor to A. O. Smith Corporation, Milwaukee, Wis., a corporation of New York Application April 21, 1943, Serial No. 483,907

3 Claims. (Cl. 220—67)

This invention relates to a head for glass lined tanks and more particularly to heads of the type employed in ceramic enameled tanks for water storage heaters such as those set forth in the United States Letters Patent No. 2,263,021 granted to Otto E. Uecker on November 18, 1941.

The principal object of the invention is to reduce any tendency of the heads to buckle at the knuckle radius under stresses caused by the radial contraction of the weld, and thereby to prevent possible injury to the enamel lining by reason of such buckling.

Another object is to provide more uniform distribution of the stresses caused by contraction of the weld and thereby prevent stress concentrations that might cause injury to the enamel.

In carrying out the invention the head flange is weakened at a plurality of points around its circumference just inside the weld to thereby provide a number of distributed points of weakness each receiving only a small part of the contraction stress referred to.

The invention is illustrated in the accompanying drawing in which:

Figure 1 is an end view of a tank with a welded head; and

Fig. 2 is a detail radial section through the joint between the head and shell of the tank taken on line 2—2 of Fig. 1.

The tank comprises a cylindrical shell 1, preferably having a flared end portion 2 for receiving a complementary circumferential skirt 3 of the end head 4.

The shell 1 and head 4 are lined with ceramic enamel 5, which lining extends upwardly between the overlapping sections of the flared portion 2 and skirt 3.

The skirt 3 preferably extends beyond the end of the portion 2 and weld metal 6 is deposited in the corner thus provided between the outer surface of skirt 3 and the end of portion 2. The weld metal 6 fuses with the adjacent parts and secures them together to provide a tank that will withstand substantial internal pressure.

The contraction of the weld metal and the adjacent stock heated in welding has a tendency to buckle the skirt 3 inwardly at the knuckle radius. In case any particular section of the head is weaker than others and in case the shell and head curvatures are not truly circular or uniform there is a possibility that the contraction stresses may concentrate in the weaker section and ultimately injure the enamel in service. It is known that crazing of enamel readily results from too high a stress concentration in the metal beneath.

In carrying out the invention, a plurality of circumferentially spaced longitudinal grooves 7 are cut in the inner surface of the skirt 3 and extend from the outer end edge of the skirt to a point between the weld 6 and the beginning of the knuckle curvature of the head. The grooves are preferably less deep than half the thickness of the head.

By distributing grooves 7, preferably equally spaced around the circumference, a plurality of points of weakness are provided that prevent transmittal of the contraction stresses circumferentially to a single point of weakness. Each point of weakness absorbs or relieves a part of the contraction stresses and there is no undesirably large concentration of the stresses at any one location. By reason of the use of the invention a thinner end head and lighter weight tank may be employed without injury to the enamel in service.

The invention may have various embodiments in accordance with the accompanying claims.

I claim:

1. In a tank of the class described, a cylindrical shell, a head having an outwardly extending skirt inserted in the end of said shell, and a weld joining the skirt to the end of the shell, said head skirt having a plurality of circumferentially spaced longitudinally extending grooves on its inner surface in the zone of said weld to relieve the welding contraction stresses and distribute the same.

2. In a tank, a cylindrical shell, a head having an outwardly extending skirt inserted in the end of said shell, a ceramic enamel lining for said head and shell, and a weld joining said skirt and shell together at the outer edges thereof only, said head skirt having a plurality of predetermined circumferentially spaced thinned portions therein providing a plurality of weak points for relieving and distributing the welding stress and protecting the enamel lining from stress concentration in the head.

3. In a tank of the class described, a cylindrical shell, a head having an outwardly extending skirt inserted in the end of said shell, and a weld joining the skirt to the end of the shell at the outer edge of their overlapping portions, said head skirt having a plurality of circumferentially spaced longitudinally extending grooves on its inner surface in the zone of said weld and extending to a position adjacent the inner edge of said overlapping portions to relieve the welding contraction stresses and distribute the same.

FRANCIS W. LAUCK.